United States Patent [19]
Yamagishi et al.

[11] Patent Number: 5,837,804
[45] Date of Patent: Nov. 17, 1998

[54] POLYIMIDES AND OPTICAL PARTS OBTAINED BY USING THE SAME

[75] Inventors: Chiaki Yamagishi; Nori Sasaki, both of Hitachi; Shigeo Nara, Mito; Hidetaka Sato, Hitachi; Shigeru Hayashida, Hitachi; Masato Taya, Hitachi, all of Japan

[73] Assignee: Hitachi Chemical Company, Ltd., Tokyo, Japan

[21] Appl. No.: 685,470

[22] Filed: Jul. 24, 1996

[30] Foreign Application Priority Data

Jul. 27, 1995 [JP] Japan .................................. 7-191324

[51] Int. Cl.$^6$ .............................. C08G 73/10; G02B 6/10
[52] U.S. Cl. ........................ 528/353; 528/170; 528/322; 528/310; 428/473.5; 264/331.19; 427/385.5; 385/129; 385/143; 385/144; 385/145; 385/146
[58] Field of Search ..................................... 528/310, 353, 528/170; 428/473.5; 264/331.19; 427/385.5; 385/129, 143, 144, 145, 146

[56] References Cited

U.S. PATENT DOCUMENTS 4,877,653  10/1989  Vora et al. .............................. 528/352

FOREIGN PATENT DOCUMENTS 0 415 447  3/1991  European Pat. Off. .
91/02239  2/1991  WIPO .

OTHER PUBLICATIONS

Chemical Abstracts, vol. 119, No. 4, 26 Jul. 1993—Abstract No. 37630
Chemical Abstracts, vol. 118, No. 12, 22 Mar. 1993—Abstract No. 103407.
Chemical Abstracts, vol. 117, No. 18, 2 Nov. 1992—Abstract No. 181942.
Chemical Abstracts, vol. 118, No. 12, 22 Mar. 1993—Abstract No. 103402.
Chemical Abstracts, vol. 107, No. 14, 5 Oct. 1987—Abstract No. 125413.
Chemical Abstracts, vol. 106, No. 24, 5 Jun. 1987—Abstract No. 197320.
Chemical Abstracts, vol. 108, No. 14, 4 Apr. 1988—Abstract No. 122080.
Chemical Abstracts, vol. 118, No. 14, 5 Apr. 1993—Abstract No. 125214.
Chemical Abstracts, vol. 116, No. 20, 18 May 1992—Abstract No. 195002.
Chemical Abstracts, vol. 122, No. 14, 3 Apr. 1995—Abstract No. 162448.
Chemical Abstracts, vol. 120, No. 6, 7 Feb. 1994—Abstract No. 55763.
T. Matsuura: "Polyimides Derived from TFDB", Macromolecules 1994, 27, 6665–6670.

*Primary Examiner*—P. Hampton-Hightower
*Attorney, Agent, or Firm*—Antonelli, Terry, Stout & Kraus, LLP

[57] ABSTRACT

Polyimides satisfying the requirements (a), (b) and (c) among the requirements described below, polyimides satisfying the requirements (b), (c) and (d), and polyimides satisfying the requirements (a), (b), (c) and (d) are excellent in transparency, isotropy and resistance to cracking (no crack is formed in the formation of a multilayer film, so that the multilayer formation is easy, namely, the polyimides are good in processability) and can give optical parts excellent in optical characteristics:

(a) the difference between the refractive index in TE mode and that in TM mode is 0.02 or less,
(b) the glass transition temperature (Tg) is 250° C or higher,
(c) the optical transmission loss at a wavelength of 0.7 to 1.6 μm is 1 dB/cm or less, and
(d) the fluorine content is 22.6% by weight or less.

19 Claims, 4 Drawing Sheets

POLYIMIDES AND OPTICAL PARTS OBTAINED BY USING THE SAME

BACKGROUND OF THE INVENTION

The present invention relates to polyimides and optical parts obtained by using the same.

Polyimides are used in the interlaminar insulating films, multilayer circuit board materials and the like of electronic parts by taking advantage of their characteristic, i.e., such an excellent heat resistance that they can withstand semiconductor processing temperatures. The polyimides are required to have a small dielectric constant for speeding-up of signals. In addition, some of the polyimides have begun to be expected as optical waveguides in the electro-optical parts and optical parts of optical communication and optical information processing systems. Such polyimides are required to have a small optical transmission loss, i.e., transparency.

A variety of such polyimides having a small dielectric constant and transparency have recently been developed. For example, JP-A 4-239037, JP-A 4-328504 and JP-A 4-328127 report examples of these polyimides. Macromolecules, Vol. 27, pp. 6665–6670 (1994) describes the optical transmission loss of these polyimides in detail.

These polyimides have fluorine atoms as substituents for reducing the dielectric constant and improving the transparency. However, when the number of the fluorine atoms as substituents is increased, namely, the fluorine content is increased, the following problems, for example, are caused: cracking is caused in the formation of a multilayer film to make the formation difficult, the processability is deteriorated, the synthesis of a precursor of the polyimide becomes difficult because of difficult increase of the molecular weight, and the storage stability of a solution of the polyimide precursor is deteriorated because of easy decrease of the viscosity.

SUMMARY OF THE INVENTION

An object of the present invention is to solve such problems in the above-mentioned prior art and provide a polyimide excellent in transparency and isotropy. Another object of the present invention is to provide a polyimide which is excellent in transparency, isotropy, resistance to cracking (no crack is formed in the formation of a multilayer film, so that the multilayer formation is easy, namely, the polyimide is good in processability), heat resistance and ease of synthesis. Still another object of the present invention is to provide an optical part excellent in optical characteristics.

The present invention provides a polyimide having (a) a difference between the refractive index in TE mode (Transverse Electron mode) and that in TM mode (Transverse Magnetic mode) of 0.02 or less, (b) a glass transition temperature (Tg) of 250° C. or higher, and (c) an optical transmission loss of 1 dB/cm or less at a wavelength of 0.7 to 1.6 µm.

The present invention also provides a polyimide satisfying the same requirements as above except that in place of the above requirement (a), the following requirement (d) is satisfied:

(d) the fluorine content is 0–22.6% by weight.

The present invention further provides a polyimide satisfying the above 4 requirements (a) to (d).

The present invention further provides a material for an optical part, which comprises a poly(amic acid) forming these polyimides after conversion, and a solvent.

The present invention still further provides an optical waveguide and an optical part obtained by using any of these polyimides.

DESCRIPTION OF THE PREFERRED EMBODIMENTS

The polyimide of the present invention is a polyimide satisfying the following three requirements (this polyimide is hereinafter referred to as "the polyimide of first embodiment");

(a) the difference between the refractive index in TE mode and that in TM mode is 0.02 or less, (b) the glass transition temperature (Tg) is 250° C. or higher, and (c) the optical transmission loss at a wavelength of 0.7 to 1.6 µm is 1 dB/cm or less.

In this embodiment, the fluorine content of the polyimide is not restricted.

In addition, the polyimide of the present invention is a polyimide satisfying the following three requirements (this polyimide is hereinafter referred to as "the polyimide of second embodiment"):

(b) the glass transition temperature (Tg) is 250° C. or higher, (c) the optical transmission loss at a wavelength of 0.7 to 1.6 µm is 1 dB/cm or less, and (d) the fluorine content is 0–22.6% by weight.

In this embodiment, the difference between the refractive index in TE mode and that in TM mode may be more than 0.02.

Further, the polyimide of the present invention is a polyimide satisfying the following four requirements (this polyimide is hereinafter referred to as "the polyimide of third embodiment"):

(a) the difference between the refractive index in TE mode and that in TM mode is 0.02 or less, (b) the glass transition temperature (Tg) is 250° C. or higher, (c) the optical transmission loss at a wavelength of 0.7 to 1.6 µm is 1 dB/cm or less, and

(d) the fluorine content is 0–22.6% by weight.

Of such polyimides, those containing repeating units of the following formula (I) are excellent in not only transparency, isotropy and resistance to cracking but also heat resistance and ease of synthesis:

(I)

wherein $R^1$ is a tetravalent aromatic group; and $R^2$ is a group of the formula (II) or the formula (III):

(II)

(III)

wherein X is a single bond, O, S, $SO_2$, $CH_2$, CO, CONHC $(CH_3)_2$ or $N(C_6H_5)$; and $Y^1$ through $Y^{12}$ are independently H, $CH_3$, CN or $NO_2$.

The polyimide of the first embodiment and the polyimide of the second embodiment cover substantially the same range of polyimides, but some polyimides are included in only one of these two categories.

Polyimides in the range covered by both the polyimide of first embodiment and the polyimide of second embodiment may be included in the polyimide of third embodiment, and the third embodiment is most preferable.

The polyimide of the first embodiment satisfies the above requirements (a), (b) and (c) and are excellent in transparency and isotropy.

The polyimide of the second embodiment satisfies the above requirements (b), (c) and (d) and are excellent in transparency and resistance to cracking.

The polyimide of the third embodiment satisfies the above requirements (a), (b), (c) and (d) and are excellent in transparency, isotropy and resistance to cracking.

The polyimide of first embodiment, second embodiment or third embodiment can be produced by any of various conventional processes and includes, for example, polyimides obtained by reacting an acid component with a diamine component, and polyimides obtained by reacting an acid component with a diisocyanate component.

The acid component includes, for example, acid anhydrides, half esters of acid anhydrides, acid chlorides, etc.

When the polyimide is obtained by reacting the acid component with a diamine component, an acid anhydride component, for example, is reacted with the diamine component to obtain a poly(amic acid) as a polyimide precursor, after which the poly(amic acid) is converted to the polyimide by dehydrating-ring closure. The polyimide can be obtained also in one stage instead of employing the above two-stage procedure.

The polyimide of first or third embodiment should have a difference between the refractive index in TE mode and that in TM mode of 0.02 or less. Too much anisotropy causes high optical transmission loss or decline of an optical signal.

When the difference between the refractive index in TE mode and that in TM mode is more than 0.02, the polyimide has too much anisotropy and hence cannot be used in a device requiring isotropy.

The difference between the refractive index in TE mode and that in TM mode can be adjusted by choosing the kinds and amounts of the acid component and diamine component used.

The refractive index in TE mode and that in TM mode can be measured by means of a commercially available apparatus. The apparatus includes, for example, Prism Coupler Model 2010 (mfd. by Metricon Co.).

The polyimide of second or third embodiment should have a fluorine content of 0–22.6% by weight, preferably 22.4% by weight or less, more preferably 22.2% by weight or less.

When the fluorine content is more than 22.6% by weight, cracking is caused in the formation of a multilayer film to make the formation difficult, the processability is deteriorated, the synthesis of a precursor of the polyimide becomes difficult because of difficult increase of the molecular weight, or the storage stability of a solution of the polyimide precursor is deteriorated because of easy decrease of the viscosity. On the other hand, when the fluorine content is 0% by weight, an optical transmission loss is generally liable to increase.

The fluorine content of the polyimide can be adjusted by choosing the kinds and amounts of the acid component and diamine component used.

The glass transition temperature (Tg) of the polyimide of first, second or third embodiment should be 250° C. or higher, preferably 270° C. or higher.

When the glass transition temperature (Tg) is lower than 250° C., the polyimide is poor in heat resistance in thermal processing such as soldering and hence is difficult to use in an optical part.

The glass transition temperature (Tg) can easily be measured by means of a commercially available apparatus, such as a thermo mechanical analyzer.

The optical transmission loss at a wavelength of 0.7 to 1.6 $\mu$m of the polyimide of first, second or third embodiment should be 1 dB/cm or less. It is preferable to have this characteristic under both measurements of TE mode and TM mode.

When the optical transmission loss is more than 1 dB/cm, the polyimide is poor in transparency and hence is difficult to use in an optical part.

The optical transmission loss is defined as the attenuation of guided light in a polyimide film due to Rayleigh scattering, etc. A method for measuring the optical transmission loss is explained below with reference to the drawing.

Figure 1:
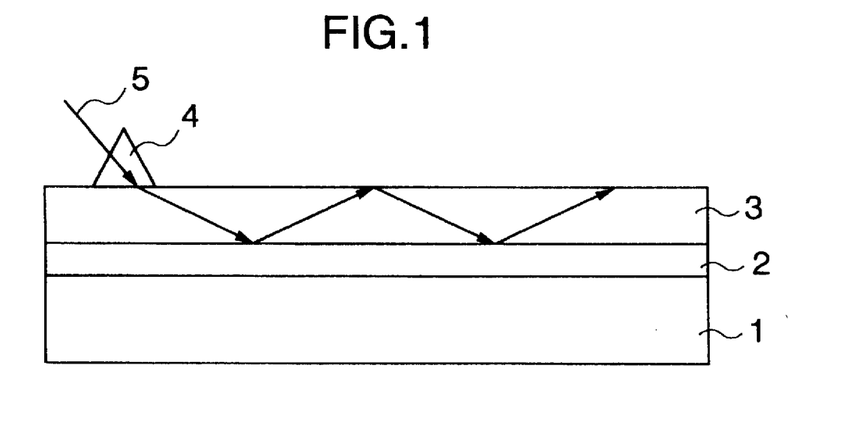
FIG. 1 is a schematic cross-sectional view of substrate for measuring optical transmission loss which has a prism placed thereon.

FIG. 1 is a schematic cross-sectional view of a substrate for measuring the optical transmission loss which has a prism placed thereon.

In FIG. 1, silicon oxide 2 is formed on a silicon substrate 1 and a prism 4 is placed on a polyimide film 3 formed on the silicon oxide 2. For example, a laser beam with a wavelength of 1.3 $\mu$m is introduced into the polyimide film 3 through the prism as an incident beam 5. The optical transmission loss can be measured by determining the attenuation of light guided through the film. Usually, the following three determining methods are often employed.

A first method uses a CCD camera and is the most poor in sensitivity among the three methods, but it is simple and effective for material screening.

A second method comprises direct sweep of a detector such as a photodiode on the guided light and measurement of scattered light.

A third method is called a prism coupler method and comprises setting a second prism at a detecting position and measuring emerging light. This method is the most sensitive, and the most preferable method.

The glass transition temperature and the optical transmission loss at a wavelength of 0.7 to 1.6 μm of the polyimide is not dependent on the fluorine content and can easily be adjusted by proper choice of the kinds and amounts of the acid component and diamine component used, regardless of the fluorine content.

The weight average molecular weight (Mw) of the polyimide of first, second or third embodiment is preferably 10,000 to 500,000, more preferably 30,000 to 200,000, since a film of the polyimide having good strength and proper thickness can be obtained.

Of polyimides included in the polyimide of first, second or third embodiment, polyimides containing repeating units of the following formula (I) are preferable from the viewpoint of heat resistance, optical characteristics, ease of synthesis, etc.:

wherein $R^1$ is s tetravalent aromatic group; and $R^2$ is a group of the formula (I) or the formula (III):

wherein X is a single bond, O, S, $SO_2$, CO, $CONHC(CH_3)_2$ or $N(C_6H_5)$; and $Y^1$ through $Y^{12}$ are independently H, $CH_3$, CN or $NO_2$.

As $R^1$, for example, wherein Ra is independently H, F, an alkyl group which may have a fluorine atom instead of a hydrogen atom or, a phenyl group which may have a fluorine atome instead of a hydrogen atom; Z is a single bond, an alkylene group which may have a fluorine atom instead of a hydrogen atom, a silicon containing group such as tetramethylsiloxane can be adopted. These polyimides need not be those consisting of only repeating units of the formula (I), and may contain other repeating units so long as the polyimides contain the repeating units of the formula (I).

As the other repeating units, for example, there can be used the formula (I) which is substituted with fluorine containing units or other units instead of the formula (II) or (III).

As preferable examples of combination of $R^1$ and $R_2$, there can be used the case in which $R^1$ is The repeating units of the formula (I) are contained in the polyimide in an amount of preferably 50 mol % or more, more preferably 70 mol % or more, and most preferably 100 mol %.

There are some preferable polyimides of first, second or third embodiment other than the polyimides containing repeating units of the formula (I). For example, polyimides containing repeating units of the following formulae are preferable, because they have good transparency and isotropy:

wherein X' is a single bond or oxygen,

The polyimide of first, second or third embodiment mainly has passive properties in itself. Active properties (e.g. light intensity modulation, phase modulation, wavelength modulation, etc.) can be imparted to the polyimide by mixing therewith a material capable of obtaining nonlinear properties owing to an external stimulus (e.g. electricity, heat or light), such as 4-N,N-dimethylamino-4'-nitrostilbene, or by introducing a substituent with nonlinear properties into the polyimide to impart the nonlinear properties to the polyimide.

The poly(amic acid) as a precursor of the polyimide of first, second or third embodiment is obtained by reacting an acid anhydride component with a diamine component in a polar solvent such as N-methyl-2-pyrrolidone, N,N-dimethylacetamide, γ-butyrolactone, dimethyl sulfoxide, diglyme, or the like. The acid anhydride component and the diamine component are preferably reacted in substantially equimolar amounts. The reaction temperature is usually 0°–40° C., and the reaction time is usually 30 minutes to 50 hours.

As the acid anhydride component containing fluorine, there can be exemplified (trifluoromethyl)pyromellitic dianhydride, di(trifluoromethyl)pyromellitic dianhydride, di(heptafluoropropyl)pyromellitic dianhydride, pentafluoroethylpyromellitic dianhydride, bis(3,5-di(trifluoromethyl)phenoxy)pyromellitic dianhydride, 2,2-bis(3,4-dicarboxyphenyl)hexafluoropropane dianhydride, 5,5'-bis(trifluoromethyl)-3,3',4,4'-tetracarboxybiphenyl dianhydride, 2,2',5,5'-tetrakis(trifluoromethyl)-3,3',4,4'-tetracarboxybiphenyl dianhydride, 5,5'-bis(trifluoromethyl)-3,3',4,4'-tetracarboxydiphenyl ether dianhydride, 5,5'-bis(trifluoromethyl)-3,3',4,4'-tetracarboxybenzophenone dianhydride, bis{(trifluoromethyl)dicarboxyphenoxy}benzene dianhydride, bis{(trifluoromethyl)dicarboxyphenoxy}trifluoromethylbenzene dianhydride, bis(dicarboxyphenoxy)trifluoromethylbenzene dianhydride, bis(dicarboxyphenoxy)bis(trifluoromethyl)benzene dianhydride, bis(dicarboxyphenoxy)tetrakis(trifluoromethyl)benzene dianhydride, 2,2-bis{(4-(3,4-dicarboxyphenoxy)phenyl}hexafluoropropane dianhydride, bis{(trifluoromethyl)dicarboxyphenoxy}biphenyl dianhydride, bis{(trifluoromethyl)dicarboxyphenoxy}bis(trifluoromethyl)biphenyl dianhydride, bis{(trifluoromethyl)dicarboxyphenoxy}diphenyl ether dianhydride, bis(dicarboxyphenoxy)bis(trifluoromethyl)biphenyl dianhydride, etc. These compounds may be used singly or as a mixture thereof.

As the acid anhydride component containing no fluorine, there can be exemplified p-terphenyl-3,4,3",4"-tetracarboxylic dianhydride, pyromellitic dianhydride, 3,3',4,4'-benzophenonetetracarboxylic dianhydride, 3,3',4,4'-biphenyltetracarboxylic dianhydride, 3,3',4,4'-(biphenyl ether)tetracarboxylic dianhydride, 1,2,5,6-naphthalenetetracarboxylic dianhydride, 2,3,6,7-naphthalenetetracarboxylic dianhydride, 2,3,5,6-pyridinetetracarboxylic dianhydride, 1,4,5,8-naphthalenetetracarboxylic dianhydride, 3,4,9,10-perylenetetracarboxylic dianhydride, 4,4'-sulfonyldiphthalic dianhydride, 3,3',4,4'-tetraphenylsilanetetracarboxylic dianhydride, m-terphenyl-3,3",4,4"-tetracarboxylic dianhydride, 3,3',4,4'-(diphenyl ether)tetracarboxylic dianhydride, 1,3-bis(3,4-dicarboxyphenyl)-1,1,3,3-tetramethyldisiloxane dianhydride, 1-(2,3-dicarboxyphenyl)-3-(3,4-dicarboxyphenyl)-1,1,3,3-tetramethyldisiloxane dianhydride, etc. These compounds may be used singly or as a mixture thereof.

As the diamine component containing fluorine, there can be exemplified 4-(1H,1H,11H-eicosafluoroundecanoxy)-1,3-diaminobenzene, 4-(1H,1H-perfluoro-1-butanoxy)-1,3-diaminobenzene, 4-(1H,1H-perfluoro-1-heptanoxy)-1,3-diaminobenzene, 4-(1H,1H-perfluoro-1-octanoxy)-1,3-diaminobenzene, 4-pentafluorophenoxy-1,3-diaminobenzene, 4-(2,3,5,6-tetrafluorophenoxy)-1,3-diaminobenzene, 4-(4-fluorophenoxy)-1,3-diaminobenzene, 4-(1H,1H,2H,2H-perfluoro-1-hexanoxy)-1,3-diaminobenzene, 4-(1H,1H,2H,2H-perfluoro-1-dodecanoxy)-1,3-diaminobenzene, (2,5)-diaminobenzotrifluoride, bis(trifluoromethyl)phenylenediamine, diaminotetra(trifluoromethyl)benzene, diamino(pentafluoroethyl)benzene, 2,5-diamino(perfluorohexyl)benzene, 2,5-diamino(perfluorobutyl)benzene, 2,2'-bis(trifluoromethyl)-4,4'-diaminobiphenyl, 3,3'-bis(trifluoromethyl)-4,4'-diaminobiphenyl, octafluorobenzidine, 4,4'-diaminodiphenyl ether, 2,2-bis(4-aminophenyl)hexafluoropropane, 1,3-bis(anilino)hexafluoropropane, 1,4-bis(anilino)octafluorobutane, 1,5-bis(anilino)decafluoropentane, 1,7-bis(anilino)tetradecafluoroheptane, 2,2'-bis(trifluoromethyl)-4,4'-diaminodiphenyl ether, 3,3'-bis(trifluoromethyl)-4,4'-diaminodiphenyl ether, 3,3',5,5'-tetrakis(trifluoromethyl)-4,4'-diaminodiphenyl ether, 3,3'-bis(trifluoromethyl)-4,4'-diaminobenzophenone, 4,4'-diamino-pterphenyl, 1,4-bis(p-aminophenyl)benzene, p-(4-amino-2- trifluoromethylphenoxy)benzene, bis(aminophenoxy)bis (trifluoromethyl)benzene, bis(aminophenoxy)tetrakis (trifluoromethyl)benzene, 2,2-bis{4-(4-aminophenoxy) phenyl}hexafluoropropane, 2,2-bis{4-(3-aminophenoxy) phenyl}hexafluoropropane, 2,2-bis{4-(2-aminophenoxy) phenyl}hexafluoropropane, 2,2-bis{4-(4-aminophenoxy)-3, 5-dimethylphenyl}hexafluoropropane, 2,2-bis{4-(4-aminophenoxy)-3,5-ditrifluoromethylphenyl}hexafluoro propane, 4,4'-bis(4-amino-2-trifluoromethylphenoxy) biphenyl, 4,4'-bis(4-amino-3-trifluoromethylphenoxy) biphenyl, 4,4'-bis(4-amino-2-trifluoromethylphenoxy) biphenyl sulfone, 4,4'-bis(3-amino-5-trifluoromethylphenoxy)diphenyl sulfone, 2,2-bis(4-(4-amino-3-trifluoromethylphenoxy)phenyl hexafluoropropane, bis{(trifluoromethyl) aminophenoxy}biphenyl, bis[{(trifluoromethyl) aminophenoxy}phenyl]hexafluoropropane, bis{2-[(aminophenoxy)phenyl]hexafluoroisopropyl}benzene, 4,4'-bis(4-aminophenoxy)octafluorobiphenyl, etc. These compounds may be used singly or as a mixture thereof.

As the diamine component containing no fluorine, there can be exemplified 4,4'-diaminodiphenyl ether, 4,4'-diaminodiphenylmethane, 4,4'-diaminodiphenyl sulfone, 4,4'-diaminodiphenyl sulfide, benzine, m-phenylenediamine, p-phenylenediamine, 2,2-bis-(4-aminophenoxyphenyl)propane, 1,5-naphthalenediamine, 2,6-naphthalenediamine, bis-(4-aminophenoxyphenyl) sulfone, bis-(4-aminophenoxyphenyl)sulfide, bis-(4-aminophenoxyphenyl)biphenyl, 1,4-bis-(4-aminophenoxy) benzene, 1,3-bis-(4-aminophenoxy)benzene, 3,4'-diaminodiphenyl ether, 3,3'-dimethyl-4,4'-diaminobiphenyl, 3,3'-dimethoxy-4,4'-diaminobiphenyl, (4,4'-diaminodiphenyl ether)-3-sulfonamide, (3,4'-diaminodiphenyl ether)-4-sulfonamide, (3,4'-diaminodiphenyl ether)-3'-sulfonamide, (3,3'-diaminodiphenyl ether)-4-sulfonamide, 4,4'-diaminodiphenylmethane-3-sulfonamide, 3,4'-diaminodiphenylmethane-4-sulfonamide, 3,4'-diaminodiphenylmethane-3'-sulfonamide, 3,3'-diaminodiphenylmethane-4-sulfonamide, (4,4'-diaminodiphenyl sulfone)-3-sulfonamide, (3,4'-diaminodiphenyl sulfone)-4-sulfonamide, (3,4'-diaminodiphenyl sulfone)-3'-sulfonamide, (3,3'-diaminodiphenyl sulfone)-4-sulfonamide, (4,4'-diaminodiphenyl sulfide)-3-sulfonamide, (3,4'-diaminodiphenyl sulfide)-4-sulfonamide, (3,3'-diaminodiphenyl sulfide)-4-sulfonamide, (3,4'-diaminodiphenyl sulfide)-3'-sulfonamide, 1,4-diaminobenzene-2-sulfonamide, (4,4'-diaminodiphenyl ether)-3-carbonamide, (3,4'-diaminodiphenyl ether)-4-carbonamide, (3,4'-diaminodiphenyl ether)-3'-carbonamide, (3,3'-diaminodiphenyl ether)-4-carbonamide, 4,4'-diaminodiphenylmethane-3-carbonamide, 3,4'-diaminodiphenylmethane-4-carbonamide, 3,4'-diaminodiphenylmethane-3'-carbonamide, 3,3'-diaminodiphenylmethane-4-carbonamide, (4,4'-diaminodiphenyl sulfone)-3-carbonamide, (3,4'-diaminodiphenyl sulfone)-4-carbonamide, (3,4'-diaminodiphenyl sulfone)-3'-carbonamide, (3,3'-diaminodiphenyl sulfone)-4-carbonamide, (4,4-diaminodiphenyl sulfide)-3-carbonamide, (3,4'-diaminodiphenyl sulfide)-4-carbonamide, (3,3'-diaminodiphenyl sulfide)-4-carbonamide, (3,4'-diaminodiphenyl sulfide)-3'-sulfonamide, 1,4-diaminobenzene-2-carbonamide, 4,4'-bis(4-aminophenoxy) biphenyl, bis{4-(3-aminophenoxy)phenyl}sulfone, etc. These compounds may be used singly or as a mixture thereof.

The polyimide of first, second or third embodiment can be produced, for example, by spin-coating on an aluminum plate a solution of the above-mentioned poly(amic acid) used as a precursor of the polyimide, and heating the coating under nitrogen stepwise at temperatures from 70° C. to 350° C. (for example, 70° C. for 1 hour, 16° C. for 1 hour, 250° C. for 1 hour, and then 350° C. for 1 hour) to convert the poly(amic acid) to the polyimide.

As a solvent for the solution, polar solvents such as N-methyl-2-pyrrolidone, N,N-dimethylacetamide, γ-butyrolactone, N,N-dimethylformamide, dimethylolfoxide, diglyme, or the like are preferable.

The concentration of contents except the solvent (solid content) is preferably 1 to 60% by weight.

The solution containing the poly(amic acid) and the solvent can be used as a material for an optical part.

In an optical part obtained by using the polyimide of first, second or third embodiment, the polyimide is usually used in a portion capable of performing an optical operation or an optical function. As such an optical part, there can be exemplified passive type optical parts, active type optical parts, etc.

The passive type optical parts include optical path diverting elements [e.g. prisms, ridge elements, unbranched waveguides (including waveguide bends)], multiplexers and branching filters [e.g. branched waveguides, directional couplers, star couplers, etc.], interference filters, polarizers, wave plates (phase plates), etc.

The active type optical parts include optical matrix switches such as waveguide type optical switches (e.g. Mach-Zehnder type optical switches, directional coupler type optical switches, etc.); optical modulators such as Mach-Zehnder type optical modulators, directional coupler type optical modulators and the like; optical deflectors; optical isolators; optical wave filters using an asymmetric directional coupler; second harmonic generators (SHG); light amplifiers; etc.

As optical parts of the present invention, the optical parts which include a waveguide as a portion capable of performing an optical operation or an optical function are preferable, because the polyimide of the present invention has excellent properties as a material for a waveguide. An optical waveguide comprises a core layer and a clad layer, and is a guide for transferring lights by sustaining the lights in the core layer. The polyimide of the present invention can be used as a material for a core layer or a clad layer of an optical waveguide. However, it is preferable to use the polyimide as a material for a core layer or both layers (a core layer and a clad layer), because the polyimide has excellent transparency.

A structure of an optical waveguide of the present invention can be the same structure as general waveguides, such as a fiber type, a flat type, a ridge type, a lens type, a buried type, etc.

In combination with a nonlinear material, the polyimide of first, second or third embodiment can be used as a material for the active type optical part capable of responding owing to an external stimulus such as electricity, heat or light.

As the nonlinear material, conventional ones can be used without particular limitation and nonlinear materials having any of the following structures can be exemplified:

A material used for producing the active type optical part obtained by using the polyimide of first, second or third embodiment can easily be prepared, for example, by mixing the aforesaid nonlinear material with a solution of the above-mentioned poly(amic acid) as a polyimide precursor by stirring or the like. In this case, the amount of the nonlinear material used is preferably 0.01 to 100 parts by weight, more preferably 0.1 to 50 parts by weight, most preferably 0.3 to 30 parts by weight, per 100 parts by weight of the polyimide precursor. When the amount is too small or too large, the resulting material tends to be poor in nonlinear characteristics, other optical characteristics, mechanical properties, stability, workability, etc.

As an example of optical part obtained by using the polyimide of the present invention, an active optical part obtained by using a material prepared by combining the polyimide and the nonlinear material is explained below with reference to the drawing.

FIGS. 2A to 2F are schematic cross-sectional views showing basic shapes of optical matrix switches and optical modulators.

Figure 2A:
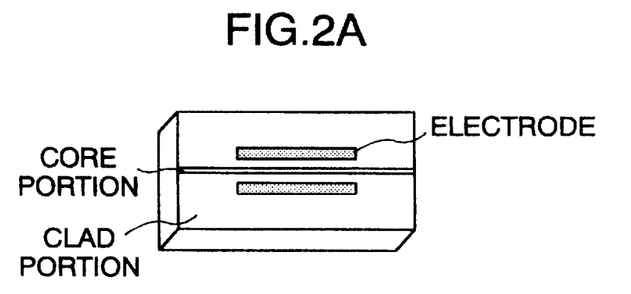
FIGS. 2A to 2F are schematic cross-sectional views showing basic shapes of optical matrix switches and modulators.
Figure 2B:
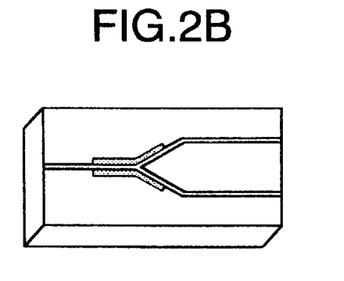
Figure 2C:
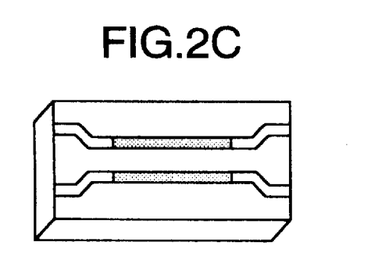
Figure 2D:
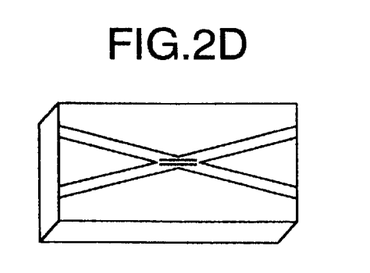
Figure 2E:
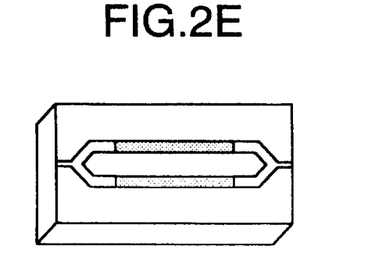
Figure 2F:
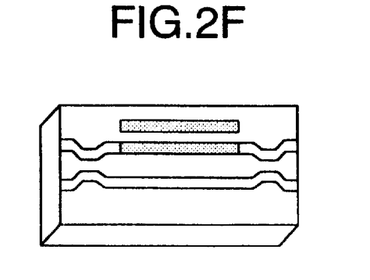
Figure 3A:
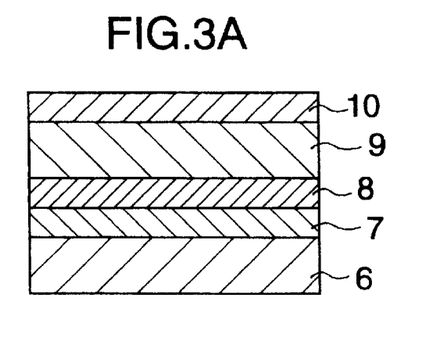
FIGS. 3A to 3F are cross-sectional views illustrating a procedure for forming an active optical waveguide.
Figure 3B:
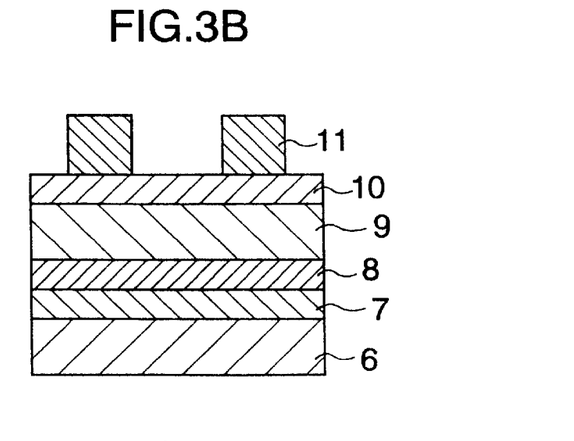
Figure 3C:
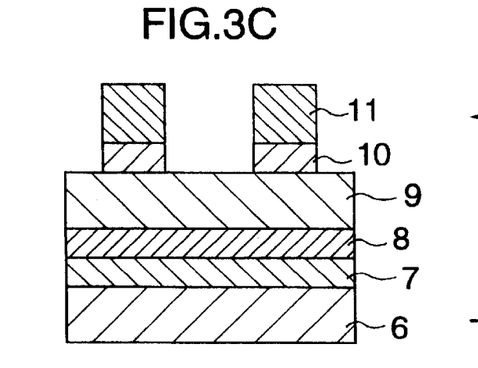
Figure 3D:
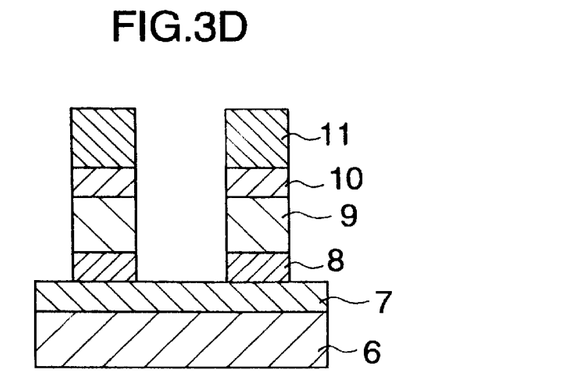
Figure 3E:
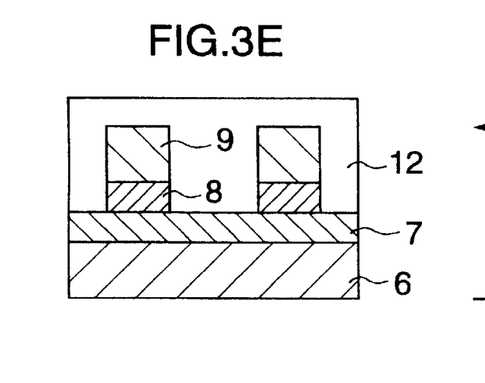
Figure 3F:
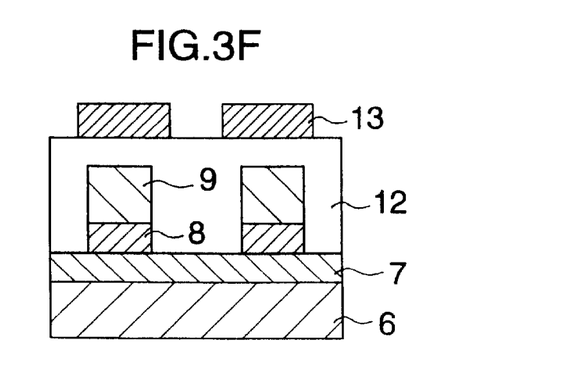
Figure 4A:
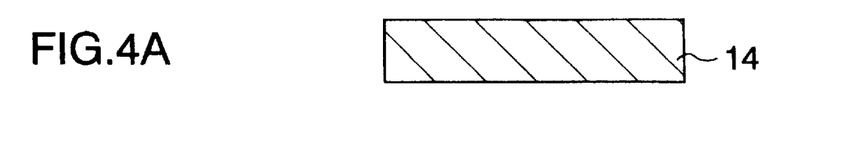
FIGS. 4A to 4F are schematic cross-sectional views showing a process for forming an optical waveguide.
Figure 4B:
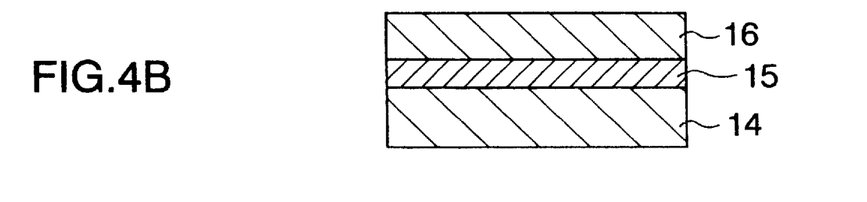
Figure 4C:
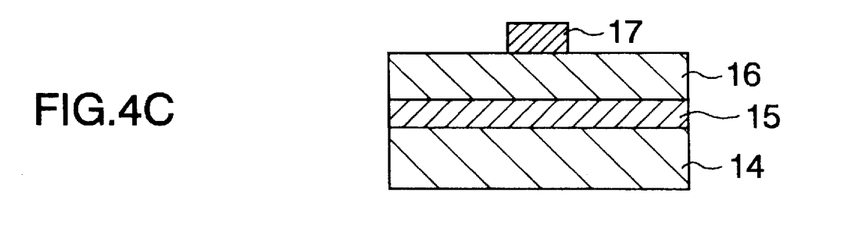
Figure 4D:
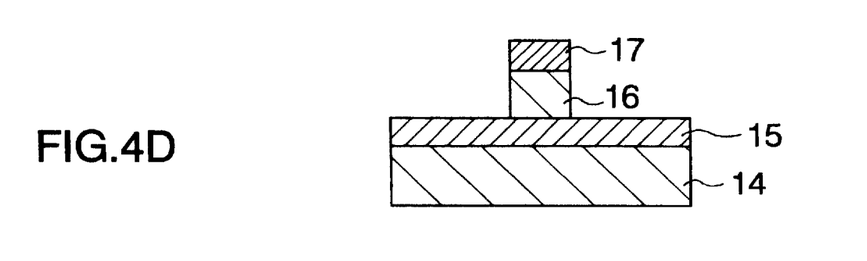
Figure 4E:
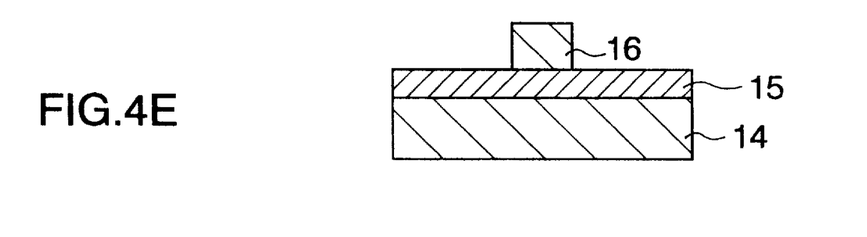
Figure 4F:
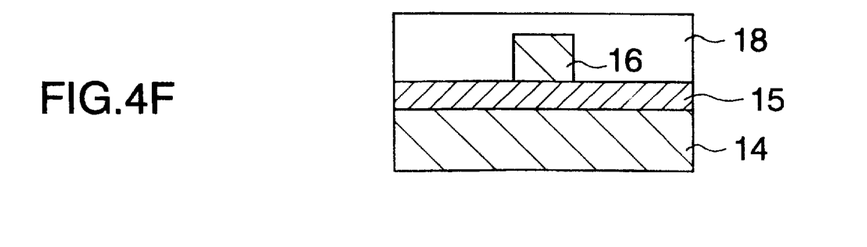

These optical matrix switches and optical modulators can be classified into the following categories: FIG. 2A a linear type, FIG. 2B a Y-branched type, and basic shapes including FIG. 2C a directional coupler type, FIG. 2D a cross (X) type, FIG. 2E a branched interference type, and FIG. 2F a balanced bridge type. For example, in the linear type shown in FIG. 2A, light is propagated through the core portion and the refractive index is changed by applying a voltage by means of electrodes, whereby a definite desired optical operation is made possible.

For forming an optical waveguide, there can be employed conventional film-forming methods such as a spin-coating technique, dipping technique, doctor blade technique, wire bar technique, roller technique, spraying technique, etc. It is sufficient that a core material and a clad material for forming the optical waveguide are chosen so as to give a refractive index difference suitable for the wavelength of light and purpose of use.

As the optical waveguide in the above-exemplified active type optical part, an optical waveguide capable of switching or modulating light can be formed by spin-coating a material comprising a solution of the poly(amic acid) used as a polyimide precursor and the nonlinear material on, for example, a silicon substrate, and heat-treating the material under nitrogen to carry out ring closure of the polyimide precursor into the polyimide and orient the nonlinear material. For example, the production of a directional coupler type optical switch, an example of such an optical waveguide is explained below with reference to FIG. 3A to 3F.

In FIG. 3A to 3F, numeral 6 shows a substrate, numeral 7 a lower electrode, numeral 8 a lower clad layer, numeral 9 a core layer, numeral 10 an aluminum layer, numeral 11 a resist layer, numeral 12 an upper clad layer, and numeral 13 an upper electrode.

The lower electrode 7 of aluminum or the like is formed on the substrate 6 of silicon or the like by vapor deposition, sputtering or the like, followed by forming thereon the lower clad layer 8 of a polyimide having a refractive index smaller than that of the core layer 9 made of the above-mentioned active material. The above-mentioned active material is applied on the lower clad layer 8 to a predetermined thickness and heated to be cured, whereby the core layer 9 is obtained.

Then, the aluminum layer 10 is formed by vapor deposition or the like, followed by coating with a resist, pre-baking, light exposure, development and after-baking, whereby the patterned resist layer 11 is obtained.

The aluminum portion not protected by the resist layer 11 is removed by wet etching, after which a portion of the polyimide layer of the core layer 9 which is not protected by the aluminum layer 10 is removed by dry etching.

The resist layer 11 is peeled off and the residual aluminum layer 10 is removed by wet etching, after which the upper clad layer 12 is formed on the rest by use of the same polyimide as used for forming the aforesaid lower clad layer 8.

Finally, the upper electrode 13 is formed over the predetermined core layer 9 through the mask pattern by vapor deposition, sputtering or the like, whereby the directional coupler type optical switch is obtained.

For orienting the nonlinear material contained in the core layer of the optical waveguide in the above-exemplified optical part, poling treatment or the like is carried out. For example, by heating the core layer while applying an electric field, the nonlinear material can be oriented simultaneously with the conversion to imide by ring closure. As a method for the application of an electric field, there can be exemplified a method of forming electrodes for the application, a method of electrifying the surface of the core layer by corona discharge, etc.

The intensity of the electric field is preferably $10^5$ V/m or more, more preferably $10^6$ V/m or more.

The following is also possible: the polyimide, the final structure is obtained by the conversion to imide by ring closure, and the material containing the polyimide is heated at a temperature higher than Tg while applying thereto an electric field, whereby the nonlinear material is oriented. The waveguide is usually formed so as to have a width of 5 to 15 μm and a height of 1 to 4 μm, and the pattern spacing is about 2 to about 3 μm.

The present invention is illustrated below in further detail with reference to Examples.

EXAMPLE 1

In a 1-liter four-necked glass flask were placed 29.36 g (0.27 mole) of p-phenylenediamine, 120.64 g (0.27 mole) of 2,2-bis(3,4-dicarboxyphenyl)hexafluoropropane dianhydride and 850 g of N,N-dimethylacetamide while introducing thereinto dry nitrogen at a flow rate of 30 ml/min. The resulting solution was stirred at room temperature for 5 hours to obtain a polyimide precursor solution having a viscosity of 50 poise.

The solution was spin-coated on a silicon wafer with a diameter of 5 inches having a silicon oxide layer as surface and heated under nitrogen at 70° C. for 1 hour, 160° C. for 1 hour, 250° C. for 1 hour, and then 350° C. for 1 hour to obtain a polyimide film of 3 μm in thickness. The fluorine content of the polyimide film is shown in Table 3.

The glass transition temperature (Tg), cracking in the formation of a multilayer film, refractive index and optical transmission loss of the obtained polyimide film were measured by the following methods, and the results obtained are shown in Table 3 and Table 5.

Glass transition temperature (Tg)

After the film was peeled from the silicon substrate, its glass transition temperature (Tg) was measured by means of a thermo-mechanical analyzer manufactured by Perkin-Elmer Corporation. Cracking in the formation of a multilayer film:

The polyimide precursor solution was spin-coated on the silicon wafer having the polyimide film formed thereon, and a polyimide film was formed in the same manner as above and whether cracks had been formed or not in the multilayer film formation was investigated.

Refractive index

Measured by means of a Prism Coupler Model 2010 (mfd. by Metricon Co.).

Optical transmission loss

Measured by means of the above-mentions apparatus shown in FIG. 1 by employing a prism coupler method as a detecting method and passing light with a wavelength of 1.3 μm.

EXAMPLES 2 to 17

Each of polyimide precursor solutions was prepared in the same manner as described in Example 1 except for using the acid anhydride component and the diamine component listed in Table 1 or Table 2, in equimolar amounts in place of those used in Example 1.

Using each of the solutions, a polyimide film was obtained in the same manner as described in Example 1. The fluorine content of the thus obtained polyimide films is shown in Table 3 and Table 4.

The glass transition temperature (Tg), cracking in the formation of a multilayer film, refractive index and optical transmission loss of the polyimide films were measured in the same manner as in Example 1. The results obtained are shown in Tables 3, 4, 5 and 6.

TABLE 1

|  | Acid anhydride component | Diamine component |
|---|---|---|
| Example 1 | 6FDA | PPD |
| Example 2 | PMDA | AF-A |
| Example 3 | PMDA | DDE |
| Example 4 | S-BPDA | DDS |
| Example 5 | 6FDA | MPD |
| Example 6 | 6FDA | DDE |
| Example 7 | S-BPDA | A-AF |
| Example 8 | S-BPDA | AF-A |
| Example 9 | S-BPDA | 8FBPDA |
| Example 10 | S-BPDA | 3,3'-DSF |

TABLE 2

|  | Acid anhydride component | Diamine component |
|---|---|---|
| Example 11 | 6FDA | 3,3'-DSF |
| Example 12 | 6FDA | DSF |
| Example 13 | ODPA | DSF |
| Example 14 | ODPA | A-AF |
| Example 15 | 6FDA | AF-A/BAPP |
| Example 16 | 6FDA | 8FBPDA/BAPB |
| Example 17 | 6FDA | 8FBPDA |

The two diamine components in each of Examples 15 and 16 were used in equimolar amounts.

The abbreviations for the acid anhydride components and diamine components listed in Table 1 and Table 2 are as follows:

6FDA: 2,2-bis(3,4-dicarboxyphenyl)hexafluoropropane dianhydride,
PMDA: pyromellitic dianhydride,
s-BPDA: 3,3',4,4'-biphenyltetracarboxylic dianhydride,
ODPA: 3,3',4,4'-(biphenyl ether)tetracarboxylic dianhydride,
PPD: p-phenylenediamine,
AF-A: 2,2-bis{4-(4-aminophenoxy)phenyl}hexafluoropropane,
DDE: 4,4'-diaminodiphenyl ether,
DDS: 4,4'-diaminodiphenyl sulfide,
MPD: m-phenylenediamine,
A-AF: 2,2'-bis(4-aminophenyl)hexafluoropropane,
8FBPDA: 4,4'-bis(4-aminophenoxy)octafluorobiphenyl,
3,3'-DSF: 3,3'-diaminodiphenyl sulfone,
DSF: 4,4'-diaminodiphenyl sulfone,
BAPP: 2,2'-bis(4-aminophenoxyphenyl)propane,
BAPB: 4,4'-bis(4-aminophenoxy)biphenyl.

TABLE 3

|  | Fluorine content (wt %) | Glass transition temperature (°C.) | Cracking in the formation of a multi-layer film |
|---|---|---|---|
| Example 1 | 22.1 | 347 | None |
| Example 2 | 16.3 | 357 | None |

TABLE 3-continued

|  | Fluorine content (wt %) | Glass transition temperature (°C.) | Cracking in the formation of a multi-layer film |
|---|---|---|---|
| Example 3 | 0 | 372 | None |
| Example 4 | 0 | 294 | None |
| Example 5 | 22.1 | 298 | None |
| Example 6 | 18.7 | 298 | None |
| Example 7 | 19.2 | 340 | None |
| Example 8 | 14.7 | 254 | None |
| Example 9 | 19.7 | 341 | None |
| Example 10 | 0 | 281 | None |

TABLE 4

|  | Fluorine content (wt %) | Glass transition temperature (°C.) | Cracking in the formation of a multi-layer film |
|---|---|---|---|
| Example 11 | 17.4 | 270 | None |
| Example 12 | 17.4 | 340 | None |
| Example 13 | 0 | 315 | None |
| Example 14 | 18.7 | 291 | None |
| Example 15 | 19.6 | 255 | None |
| Example 16 | 17.9 | 287 | None |
| Example 17 | 28.9 | 282 | Slightly |

TABLE 5

|  | Refractive index (1300 nm) | | | Optical transmission loss (dB/cm) | |
|---|---|---|---|---|---|
|  | TE | TM | Δn | TM | TE |
| Example 1 | 1.5559 | 1.5473 | 0.0086 | 0.55 | 0.59 |
| Example 2* | 1.6768 | 1.6049 | 0.0719 | 0.9 | 0.78 |
| Example 3* | 1.6938 | 1.6182 | 0.0756 | 0.78 | 0.90 |
| Example 4 | 1.6941 | 1.6803 | 0.0138 | 0.85 | 0.76 |
| Example 5 | 1.5542 | 1.5492 | 0.005 | 0.94 | 0.96 |
| Example 6 | 1.5672 | 1.5593 | 0.0079 | 0.52 | 0.45 |
| Example 7 | 1.5864 | 1.5768 | 0.0096 | 0.69 | 0.71 |
| Example 8 | 1.598 | 1.5881 | 0.0099 | 0.75 | 0.75 |
| Example 9 | 1.611 | 1.5928 | 0.0182 | 0.94 | 0.82 |
| Example 10 | 1.6618 | 1.6538 | 0.008 | 0.96 | 0.81 |

Note) *Examples of the second embodiment of the present invention.

TABLE 5

|  | Refractive index (1300 nm) | | | Optical transmission loss (dB/cm) | |
|---|---|---|---|---|---|
|  | TE | TM | Δn | TM | TE |
| Example 11 | 1.5697 | 1.5657 | 0.004 | 0.69 | 0.68 |
| Example 12 | 1.5703 | 1.5636 | 0.0067 | 0.78 | 0.77 |
| Example 13 | 1.6492 | 1.6401 | 0.0091 | 0.51 | 0.57 |
| Example 14 | 0.5745 | 1.5655 | 0.009 | 0.57 | 0.45 |
| Example 15 | 0.5684 | 1.5627 | 0.0057 | 0.73 | 0.66 |
| Example 16 | 0.5715 | 1.5646 | 0.0069 | 0.97 | 0.94 |
| Example 17* | 1.5445 | 1.535 | 0.0095 | 0.9 | 0.84 |

Note) *An example of the first embodiment of the present invention.

Comparative Examples 1–3 and Example 20

Polyimide films were obtained in the same manner as described in Example 1 except for using each combination of the acid anhydride component and the diamine component listed in Table 7 in place of that used in Example 1. The fluorine content of the polyimide films is shown in Table 8.

The glass transition temperature (Tg), cracking in the formation of a multilayer film, refractive 10 index and optical transmission loss of the polyimide films were measured in the same manner as in Example 1. The results obtained are shown in Table 8 and Table 9.

TABLE 7

|  | Acid anhydride component | Diamine component | Tg (°C.) |
|---|---|---|---|
| Comparative Example 1 | S-BPDA | TFDB | 279 |
| Example 20 | ODPA | mAPPS | 220 |
| Comparative Example 2 | 6FDA | BAPP | 257 |
| Comparative Example 3 | TPDA | DDE | 334 |

The abbreviations for the acid anhydride components and diamine components listed in Table 7 are as follows:
TPDA: p-terphenyl-3,4,3",4"-tetracarboxylic dianhydride,
TFDB: 2,2'-bis(trifluoromethyl)-4,4'-diaminobiphenyl,
MAPPS: bis{4-(3-aminophenoxy)phenyl}sulfone.

TABLE 8

|  | Fluorine content (wt. %) | Tg (°C.) | Cracking* |
|---|---|---|---|
| Comparative Example 1 | 19.7 | 279 | None |
| Example 20 | 0 | 220 | None |
| Comparative Example 2 | 13.9 | 257 | None |
| Comparative Example 3 | 0 | 334 | None |

Note) *Cracking in the formation of a multilayer film

TABLE 9

|  | Refractive index (1300 nm) | | | Optical transmission loss (dB/cm) | |
|---|---|---|---|---|---|
|  | TE | TM | Δn | TM | TE |
| Comparative Example 1 | 1.6443 | 1.5284 | 0.1159 | 2.57 | 0.85 |
| Example 20 | 1.6524 | 1.6461 | 0.0063 | 0.96 | 0.87 |
| Comparative Example 2 | 1.5769 | 1.5715 | 0.0054 | 1.44 | 1.44 |
| Comparative Example 3 | 1.7344 | 1.6302 | 0.1042 | 5 | 3.54 |

As seen in the foregoing Tables 7–9, Tg can be greater tna 220° C.

EXAMPLE 18

FIGS. 4A to 4F shows a process for producing the optical waveguide of a passive type optical part.

A silicon wafer with a diameter of 5 inches was used as a silicon wafer substrate 14. A solution (resin content 15 wt %, viscosity 50 dpa·s) in N,N-dimethylacetamide (DMAC) of a poly(amic acid) obtained from pyromellitic dianhydride (PMDA) and 4,4'-diaminodiphenyl ether (DDE) was spin-coated on the silicon wafer substrate 14 as a lower clad layer 15, and heated with a dryer at 100° C. for 30 minutes, 200°

C. for 30 minutes, and then 350° C. for 60 minutes to be cured, whereby a polyimide film of 10 μm in thickness was formed. The refractive indices of the film at a wavelength of 1300 nm were 1.6938 (TE mode) and 1.6182 (TM mode). The optical transmission loss was 0.90 dB/cm (TE mode) and 0.78 dB/cm (TM mode). The fluorine content was 0% by weight and Tg was 372° C.

A solution (resin content 15 wt %, viscosity 50 dPa·s) in DMAC of a poly(amic acid) obtained from 3,3',4,4'-biphenyltetracarboxylic dianhydride (BPDA) and 1,4-phenylenediamine (PPD) was spin-coated as a core layer 16 on the polyimide film, and cured under the same conditions as described above to form a polyimide film of 15 μm in thickness. The refractive index of this film was 1.7814 (TE mode) and 1.5812 (Tm mode). The optical transmission loss was 0.90 dB/cm (TE mode) and 0.41 dB/cm (TM mode). Tg was 365° C.

Next, RU-1600P (mfd. by Hitachi Chemical Company, Ltd.) was spin-coated on the film as a resist, dried at 100° C., exposed to light from a mercury lamp, and then developed. Using the thus obtained resist pattern 17 as a mask, reactive ion etching (O2-RIE) was carried out with oxygen so as to leave a predetermined pattern of the optical waveguide. After the resist was peeled off, a poly(amic acid) obtained from PMDA and DDE was spin-coated on the rest as an upper clad layer 18 so that the film thickness after curing might be 20 μm. Then, the poly(amic acid) was cured to form a linear optical waveguide (15 μm long, 15 μm wide and 10 cm deep).

Figure 5:
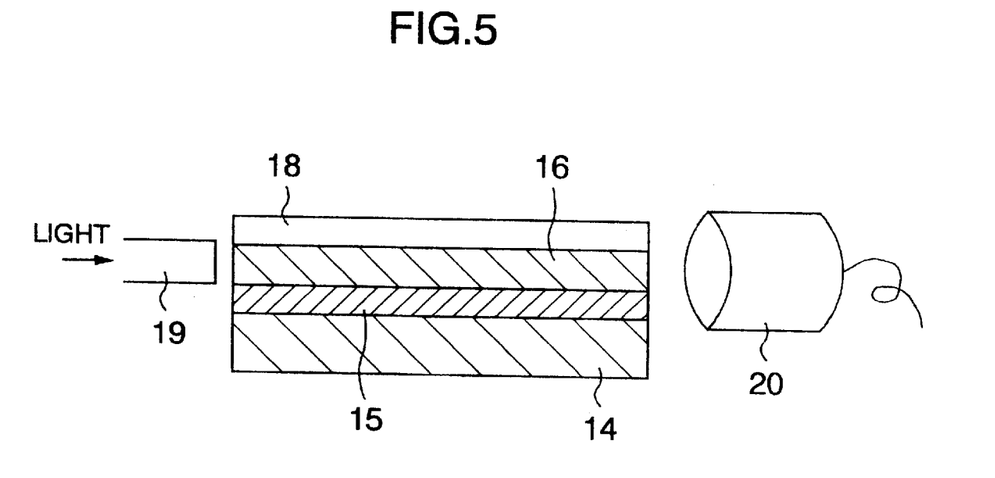
FIG. 5 is a schematic view of an apparatus for measuring the light loss of an optical waveguide.

For measuring the light loss of this optical waveguide, each sample was prepared by cutting both ends of the silicon wafer with a dicer. A method for measuring the light loss is shown in FIG. 5.

An optical fiber 19 of quartz was connected to the cut optical waveguide so as to allow the core of the former to coincide with the edge face of the latter, and light with a wavelength of 1300 nm was introduced into the optical waveguide through the optical fiber 19. Light coming out of the opposite edge face was detected by means of an optical sensor 20.

When samples of 5 cm and 10 cm, respectively, in length were prepared and the light loss of the optical waveguide was calculated from the gradient of light attenuation, the light loss was 0.6 dB/cm.

EXAMPLE 19

In the same manner as in Example 18, a polyimide obtained from ODPA and AAF (the same polyimide as Example 14) was used as a lower clad layer and an upper clad layer and a polyimide obtained from BPDA and 1,4-diaminodiphenyl sulfide (DDS) was used as a core layer, and the light loss was measured and found to be 0.8 dB/cm. The refractive index at a wavelength of 1300 nm of the polyimide obtained from BPDA and DDS was 1.6941 (TM mode) and 1.6803 (TM mode). The optical transmission loss was 0.85 dB/cm (TE mode) and 0.75 dB/cm (TM mode). Tg was 294° C.

As described above, the polyimide of the present invention is excellent in not only transparency and isotropy but also resistance to cracking and ease of synthesis.

Optical parts obtained from such a polyimide are excellent in optical characteristics.

What is claimed is:

1. An optical waveguide comprising a core layer and a clad layer, in which one of the core and clad layers comprises a polyimide having (a) a difference between the refractive index in TE mode and that in TM mode of 0.02 or less.

(b) a glass transition temperature (Tg) of 250° C. or higher, and (c) an optical transmission loss of 1 dB/cm or less at a wavelength of 0.7 to 1.6 μm.

2. An optical waveguide comprising a core layer and a clad layer, in which one of the core and clad layers comprises a polyimide having (b) a glass transition temperature (Tq) of 250° C. or higher, (c) an optical transmission loss of 1 dB/cm or less at a wavelength of 0.7 to 1.6 μm, and (d) a fluorine content of 0–22.6% by weight.

3. An optical waveguide comprising a core layer and a clad layer, in which one of the core and clad layers comprises a polyimide having (a) a difference between the refractive index in TE mode and that in TM mode of 0.02 or less, (b) a glass transition temperature (Tg) of 250° C. or higher, (c) an optical transmission loss of 1 dB/cm or less at a wavelength of 0.7 to 1.6 μm, and (d) a fluorine content of 0–22.6% by weight.

4. An optical waveguide according to claim 3, wherein the core layer comprises the polyimide.

5. An optical waveguide comprising a core layer and a clad layer, in which the core layer comprises a polyimide having (a) a difference between the refractive index in TE mode and that in TM mode of 0.02 or less, (b) a glass transition temperature (Tg) of 250° C. or higher, (c) an optical transmission loss of 1 dB/cm or less at a wavelength of 0.7 to 1.6 μm, and (d) a fluorine content of 0–22.6% by weight and a nonlinear optical material.

6. A process for using a polyimide which comprises using a polyimide having (a) a difference between the refractive index in TE mode and that in TM mode of 0.02 or less, (b) a glass transition temperature (Tg) of 250° C. or higher, and (c) an optical transmission loss of 1 dB/cm or less at a wavelength of 0.7 to 1.6 μm as a core layer or a clad layer in an optical waveguide.

7. A process for using a polyimide which comprises using a polyimide having (a) a glass transition temperature (Tg) of 250° C. or higher, (b) an optical transmission loss of 1 dB/cm or less at a wavelength of 0.7 to 1.6 μm, and (c) a fluorine content of 0–22.6% by weight as a core layer or a clad layer in an optical waveguide.

8. A process for using a polyimide which comprises using a polyimide having

(a) a difference between the refractive index in TE mode and that in TM mode of 0.02 or less, (b) a glass transition temperature (Tg) of 250° C. or higher,

(c) an optical transmission loss of 1 dB/cm or less at a wavelength of 0.7 to 1.6 μm, and (d) a fluorine content of 0–22.6% by weight as a core layer or a clad layer in an optical waveguide.

9. A process for using a polyimide which comprises using a polyimide having
(a) a difference between the refractive index in TE mode and that in TM mode of 0.02 or less,
(b) a glass transition temperature (Tg) of 250° C. or higher,
(c) an optical transmission loss of 1 dB/cm or less at a wavelength of 0.7 to 1.6 μm, and
(d) a fluorine content of 0–22.6% by weight, which contains repeating units represented by the formula (I):

wherein $R^1$ is a tetravalent aromatic group, and $R_2$ is a group of the formula (II) or the formula (III)

wherein X is a single bond, O, S, $SO_2$, $CH_2$, CO, CONHC $(CH_3)_2$ or or $N(CH_6H_5)$; and $Y^1$ through $Y^{12}$ are independently H, $CH_3$, CN or $NO_2$ as a core layer or a clad layer in an optical waveguide.

10. An optical waveguide comprising a core layer and a clad layer, in which one of the core and clad layers comprises a polyimide having
(a) a difference between the refractive index in TE mode and that in TM mode of 0.02 or less, and
(b) an optical transmission loss of 1 dB/cm or less at a wavelength of 0.7 to 1.6 μm.

11. An optical waveguide comprising a core layer and a clad layer, in which one of the core and clad layers comprises a polyimide having
(a) a difference between the refractive index in TE mode and that in TM mode of 0.02 or less,
(b) a glass transition temperature (Tg) of 220° C. or higher, and
(c) an optical transmission loss of 1 dB/cm or less at a wavelength of 0.7 to 1.6 μm.

12. An optical waveguide comprising a core layer and a clad layer, in which one of the core and clad layers comprises a polyimide having
(a) a glass transition temperature (Tg) of 220° C. or higher,
(b) an optical transmission loss of 1 dB/cm or less at a wavelength of 0.7 to 1.6 μm, and
(c) a fluorine content of 0–22.6% by weight.

13. An optical waveguide comprising a core layer and a clad layer, in which one of the core and clad layers comprises a polyimide having
(a) an optical transmission loss of 1 dB/cm or less at a wavelength of 0.7 to 1.6 μm, and
(b) a fluorine content of 0–22.6% by weight.

14. An optical waveguide comprising a core layer and a clad layer, in which one of the core and clad layers comprises a polyimide having
(a) a difference between the refractive index in TE mode and that in TM mode of 0.02 or less,
(b) an optical transmission loss of 1 dB/cm or less at a wavelength of 0.7 to 1.6 μm, and
(c) a fluorine content of 0–22.6% by weight.

15. An optical waveguide comprising a core layer and a clad layer, in which one of the core and clad layers comprises a polyimide having
(a) a difference between the refractive index in TE mode and that in TM mode of 0–22.6% or less,
(b) a glass transition temperature (Tg) of 220° C. or higher,
(c) an optical transmission loss of 1 dB/cm or less at a wavelength of 0.7 to 1.6 μm, and
(d) a fluorine content of 0–22.6% by weight.

16. An optical waveguide according to claim 14, wherein the core layer comprises the polyimide.

17. An optical waveguide according to claim 15, wherein the core layer comprises the polyimide.

18. An optical waveguide comprising a core layer and a clad layer, in which the core layer comprises a polyimide having
(a) a difference between the refractive index in TE mode and that in TM mode of 0.02 or less,
(b) an optical transmission loss of 1 dB/cm or less at a wavelength of 0.7 to 1.6 μm, and
(c) a fluorine content of 0–22.6% by weight.

19. An optical waveguide comprising a core layer and a clad layer, in which the core layer comprises a polyimide having
(a) a difference between the refractive index in TE mode and that in TM mode of 0.02 or less,
(b) a glass transition temperature (Tg) of 220° C. or higher,
(c) an optical transmission loss of 1 dB/cm or less at a wavelength of 0.7 to 16 μm, and
(d) a fluorine content of 0–22.6% by weight and a nonlinear optical material.

* * * * *